United States Patent
Huang

(10) Patent No.: US 10,850,997 B2
(45) Date of Patent: Dec. 1, 2020

(54) METHOD OF BORON-CONTAINED WASTEWATER TREATMENT

(71) Applicant: National Cheng Kung University, Tainan (TW)

(72) Inventor: Yao-Hui Huang, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 98 days.

(21) Appl. No.: 16/177,000

(22) Filed: Oct. 31, 2018

(65) Prior Publication Data

US 2020/0131062 A1  Apr. 30, 2020

(51) Int. Cl.
| | |
|---|---|
| C02F 1/70 | (2006.01) |
| C02F 1/72 | (2006.01) |
| C02F 101/10 | (2006.01) |
| C02F 3/28 | (2006.01) |

(52) U.S. Cl.
CPC ............ *C02F 1/722* (2013.01); *C02F 1/705* (2013.01); *C02F 3/286* (2013.01); *C02F 3/2833* (2013.01); *C02F 2101/108* (2013.01)

(58) Field of Classification Search
None
See application file for complete search history.

(56) References Cited

U.S. PATENT DOCUMENTS 6,143,182 A * 11/2000 Huang .................... C02F 1/722
                                                     210/712
2016/0340216 A1* 11/2016 Huang .................... C02F 1/722

FOREIGN PATENT DOCUMENTS

TW          201827338 A  *  8/2018  ................ B01J 7/26

OTHER PUBLICATIONS

Vu, Xuantung et al—"Reclaiming Boron as Calcium Perborate Pellets from Synthetic Wastewater by Integrating Chemical Oxo-Precipitation within a Fluidized-Bed Crystallizer"—ACS Sustainable Chem. Eng. 2018 (Year: 2018).*
TW 201827338 Machine Translation—2018 (Year: 2018).*
Garcia-Segura, Sergi et al—"Fluidized-bed Fenton process as alternative wastewater treatment technology—A review"—Journal of the Taiwan Institute of Chemical Engineers, 2016 (Year: 2016).*

* cited by examiner

*Primary Examiner* — Bradley R Spies
(74) *Attorney, Agent, or Firm* — Muncy, Geissler, Olds & Lowe, P.C.

(57) ABSTRACT

A method of boron-contained wastewater treatment includes the following steps. Pretreatment: Mix a boron-contained wastewater with hydrogen peroxide for reaction at pH 8-12. Precipitation: Add n moles of barium compound into the pretreated boron-contained wastewater to provide perborate precipitation at pH 8.5-12. The number n is obtained from an equation of $n=([B]*a+[NO_3]*0.01+[F]*0.01+[CO_3]*1+[SO_4]*1)*V$ wherein a is ranged from 0.6-0.9. $[B]$, $[NO_3]$, $[F]$, $[CO_3]$, and $[SO_4]$ are molarities of boron, nitrate ion, fluoride ion, carbonate ion, and sulfate ion of the boron-container wastewater. V is the volume of the boron-container wastewater. A fluidized bed reactor is used.

5 Claims, 1 Drawing Sheet

METHOD OF BORON-CONTAINED WASTEWATER TREATMENT

BACKGROUND OF THE INVENTION

Field of the Invention

The present invention relates to a method of wastewater treatment, more especially to a method of boron-contained wastewater treatment.

Description of the Prior Art

Boron exists in the nature as boric acid or borate salt usually. Nowadays, boron compound is widely used in different industries, such as boron-silicate glass, ceramic glaze, bleaching powder, insecticide, or nuclear plant. Boron is also essential to animals and plants. However, excessive boron is hazardous to health of animals or plants. Thus, many boron-contained industrial materials are restricted by the SVHC list of ECHA. As a result, treatment of boron-wastewater becomes important.

COP (Chemical Oxo-Precipitation) method is a useful method of boron-contained wastewater treatment. Different from the conventional chemical precipitation method, the COP method uses hydrogen peroxide to transfer boron into perborate ion, and further make it react with alkaline earth metal to form precipitation. Thereby, boron can be removed at room temperature. Specifically, barium salt is a preferred coagulant which is able to reduce the concentration of boron from 1000 ppm-B to 3 ppm-B. The removal rate can reach 99.7% or greater.

However, in practice, some boron-contained wastewater can reach a boron removal rate of only 30-40% when treated by the COP method. Thus, the boron-contained wastewater is unable to meet the discharge standard. The major reason is that the co-existed anions capture the barium ions to reduce the removal rate of boron.

SUMMARY OF THE INVENTION

The main object of the present invention is to provide a method of boron-contained wastewater treatment to alleviate the anion competition so as to improve the removal rate of boron.

To achieve the above and other objects, the method of boron-contained wastewater treatment includes the following steps.

Pretreatment: Mix a boron-contained wastewater with hydrogen peroxide for reaction at pH 8-12.

Precipitation: Add barium compound into the pretreated boron-contained wastewater to provide perborate precipitation at pH 8.5-12 wherein a molarity of boron of the boron-contained wastewater is defined as [B], a molarity of nitrate ion of the boron-contained wastewater is defined as $[NO_3]$, a molarity of fluoride ion of the boron-contained wastewater is defined as [F], a molarity of carbonate ion of the boron-contained wastewater is defined as $[CO_3]$, a molarity of sulfate ion of the boron-contained wastewater is defined as $[SO_4]$, a volume of the boron-contained wastewater is defined as V, n moles of the barium compound is added, and n is obtained from an equation that $n=([B]*a+[NO_3]*0.01+[F]*0.01+[CO_3]*1+[SO_4]*1)*V$ wherein a is ranged from 0.6-0.9.

A fluidized bed reactor having an upper section and a lower section is used. The lower section has a wastewater inlet and a coagulant inlet. The upper section has an outlet. A reflux piping is arranged between the upper section and the lower section to connect the upper section and the lower section. The pretreated boron-contained wastewater and the barium compound are injected into the lower section via the wastewater inlet and the coagulant inlet respectively and are mixed in the lower section. Make the boron-contained wastewater with barium compound flow from the lower section toward the upper section and flow back to the lower section via the reflux piping for circulation in order to form homogeneous particles of perborate salt.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
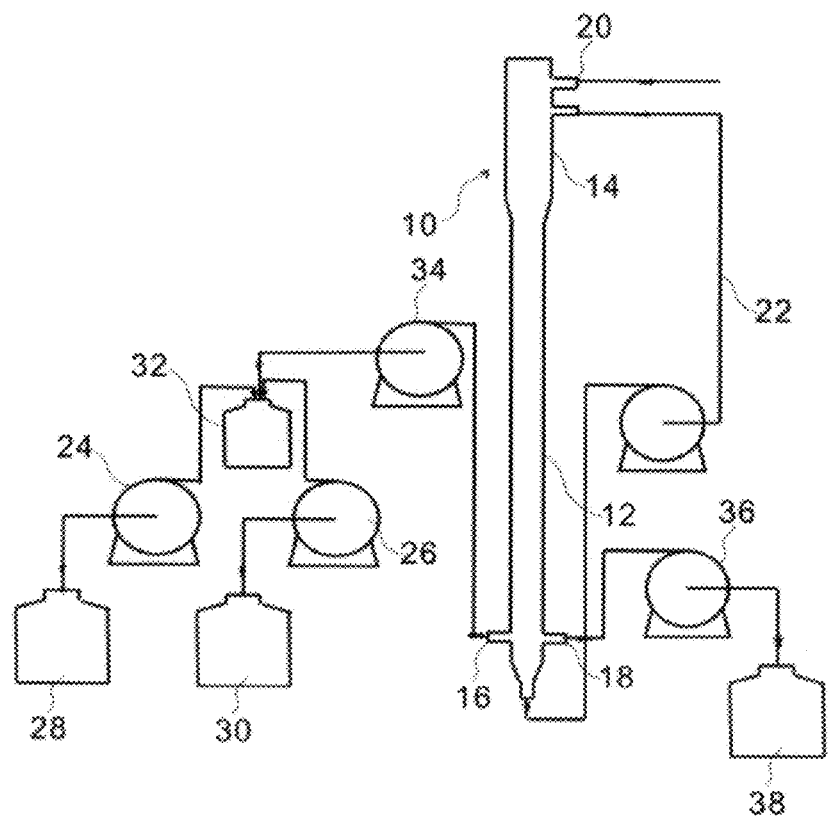
FIG. 1 is an illustration showing a fluidized bed reactor of the present invention.

The method of boron-contained wastewater treatment of the present invention includes the following steps.

Pretreatment: Mix a boron-contained wastewater (the molarity of boron the boron-contained wastewater is preferably greater than 50 mM) with hydrogen peroxide for reaction at pH 8-12 (more preferably at pH 9-11).

Precipitation: Add barium compound (preferably barium chloride) into the pretreated boron-contained wastewater to provide perborate precipitation at pH 8.5-12 (more preferably at pH 9-10.5) wherein a molarity of boron of the boron-contained wastewater is defined as [B], a molarity of nitrate ion of the boron-contained wastewater is defined as $[NO_3]$, a molarity of fluoride ion of the boron-contained wastewater is defined as [F], a molarity of carbonate ion of the boron-contained wastewater is defined as $[CO_3]$, a molarity of sulfate ion of the boron-contained wastewater is defined as $[SO_4]$, a volume of the boron-contained wastewater is defined as V, n moles of the barium compound is added, and n is obtained from an equation that $n=([B]*a+[NO_3]*0.01+[F]*0.01+[CO_3]*1+[SO_4]*1)*V$ wherein a is ranged from 0.6-0.9.

In the present embodiment, a fluidized bed reactor 10 having an upper section 14 and a lower section 12 is used. The upper section 14 has a larger diameter than that of the lower section 12. The lower section 12 has a wastewater inlet 16 and a coagulant inlet 18. The upper section 14 has an outlet 20. A reflux piping 22 is arranged between the upper section 12 and the lower section 12 to connect the upper section 14 and the lower section 12. Hydrogen peroxide 28 and the boron-contained wastewater 30 are continuously injected into a mixing tank by pumps 24,26 to react therein. The pretreated boron-contained wastewater 32 and the barium compound 38 are injected into the lower section 12 via the wastewater inlet 16 and the coagulant inlet 18 respectively by pumps 34,36 and are mixed in the lower section 12. Make the boron-contained wastewater 30 with barium compound 38 flow from the lower section 12 toward the upper section 14 and flow back to the lower section 12 via the reflux piping 22 for circulation in order to form homogeneous particles of perborate salt. Because of the different diameters of the reactor 10 and the circulation, solid particles collide with each other to form homogeneous particles with low moisture content. The boron-contained wastewater 30 is continuously injected into the mixing tank to continuously remove boron in the wastewater in the form of perborate salt. Preferably, a height of a granular bed is higher than 40 cm. An outflowed water has a pH ranged between 8-11.

In the step of pretreatment, boric acid in the boron-contained wastewater is transferred into perboric acid to be easier to react with barium chloride in order to form barium perborate precipitation. However, plural kinds of anions in the wastewater compete with perboric acid to capture barium ion, so the removal rate of boron is reduced. Specifically, carbonate ion and sulfate ion are the primary anions competing with perboric acid, more especially sulfate ion. When the molarity of co-existed anions in the wastewater is greater than 10 mM, the removal rate of boron is reduced significantly. Thus, the competition of anion has to be considered in the step of precipitation. The amount of barium compound is alternated according to the composition of the wastewater following the equation mentioned above. As a result, the removal rate of boron is significantly improved to reach 98.5% or greater, and the molarity of boron can be reduced to 1.5 mM or less.

The following is the tests on two samples of industrial wastewater using the method of the present invention.

First, the boron-contained wastewater of sample A has a pH at 0.8 and is acidic. The composition of sample A is analyzed as shown at table 1. It is noted that the concentration of boron of sample A reaches 1220 ppm.

TABLE 1

| Cation | | Anion | |
|---|---|---|---|
| Ion | Concentration (mg/L) | Ion | Concentration (mg/L) |
| $Ca^{2+}$ | 680 | B | 1220 |
| $Fe^{3+}$ | 2.17 | $Cl^-$ | 12023 |
| $Mg^{2+}$ | 6.13 | $NO_3^-$ | 34 |
| Si | 11.1 | $SO_4^{2-}$ | 676 |

Second, sample B is a boron-contained wastewater discharged by semiconductor plant having a pH at 11.5 to be alkalic. The composition of sample B is analyzed as shown at table 2. It is noted that the concentration of boron reaches 2300 ppm, and the concentrations of sulfate ion and carbonate ion reach 4000 ppm and 10000 ppm respectively.

TABLE 2

| Cation | | Anion | |
|---|---|---|---|
| Ion | Concentration (mg/L) | Ion | Concentration (mg/L) |
| $Cd^{2+}$ | 0.912 | B | 2300 |
| $Na^+$ | 5.94 | $CO_3^{2-}$ | 10200 |
| $Pb^{2+}$ | 2.74 | $SO_2^-$ | 4320 |
| $Tl^{2+}$ | 9.59 | | |

Figure 2:
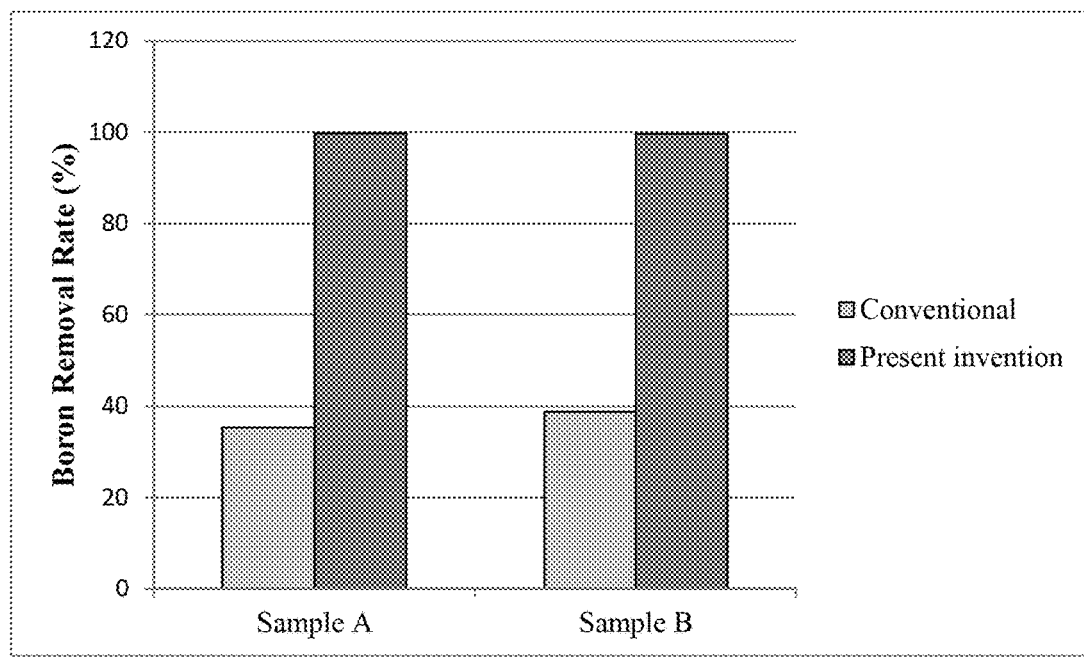
FIG. 2 is chart to compare boron removal rates of conventional method and the present invention on sample A and sample B.

The removal rates of boron of sample A and sample B using the method of the present invention or not are compared in FIG. 2. When the method of the present invention is not used, the removal rates of sample A and sample b are only 35.38% and 38.88% respectively. However, when the method of the present invention is used, the removal rates of boron of sample A and sample B reach 99.72% and 99.63% respectively. It is obvious that the method of the present invention can help improve the removal rate of boron.

What is claimed is:

1. A method of boron-contained wastewater treatment, comprising steps of:
    pretreatment: mixing a boron-contained wastewater with hydrogen peroxide for reaction at pH 8-12;
    calculation: calculating an amount of barium compound by an equation that $n=([B]*a+[NO_3]*0.01+[F]*0.01+[CO_3]*1+[SO_4]*1)*V$, wherein a molarity of boron of the boron-contained wastewater is defined as [B], a molarity of nitrate ion of the boron-contained wastewater is defined as $[NO_3]$, a molarity of fluoride ion of the boron-contained wastewater is defined as [F], a molarity of carbonate ion of the boron-contained wastewater is defined as $[CO_3]$, a molarity of sulfate ion of the boron-contained wastewater is defined as $[SO_4]$, a volume of the boron-contained wastewater is defined as V, n is defined as a number of moles of the barium compound, a is ranged from 0.6-0.9;
    precipitation: adding the barium compound into the pretreated boron-contained wastewater according to calculation results of the calculation step to provide perborate precipitation at pH 8.5-12;
    wherein a fluidized bed reactor having an upper section and a lower section is used, the lower section has a wastewater inlet and a coagulant inlet, the upper section has an outlet, a reflux piping is arranged between the upper section and the lower section to connect the upper section and the lower section; hydrogen peroxide and the boron-contained wastewater are continuously injected into a mixing tank to react therein, the pretreated boron-contained wastewater and the barium compound are injected into the lower section via the wastewater inlet and the coagulant inlet respectively and are mixed in the lower section, make the boron-contained wastewater with barium compound flow from the lower section toward the upper section and flow back to the lower section via the reflux piping for circulation in order to form homogeneous particles of perborate salt.

2. The method of boron-contained wastewater treatment of claim 1, wherein the molarity of boron of the boron-contained wastewater is higher than 50 mM.

3. The method of boron-contained wastewater treatment of claim 1, wherein a mole ratio of the hydrogen peroxide to the boron of the boron-contained wastewater is ranged from 0.5 to 3.

4. The method of boron-contained wastewater treatment of claim 1, wherein the step of pretreatment is carried on at pH 9-11, the step of precipitation is carried on at pH 9-10.5.

5. The method of boron-contained wastewater treatment of claim 1, wherein a height of a granular bed is higher than 40 cm, an outflowed water has a pH ranged between 8-11.

\* \* \* \* \*